United States Patent
Ehlers

(10) Patent No.: US 7,582,141 B2
(45) Date of Patent: Sep. 1, 2009

(54) DIESEL PARTICULATE FILTER PULSE CLEANER FLOW DIRECTOR SYSTEM AND METHOD

(75) Inventor: Mark S. Ehlers, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 190 days.

(21) Appl. No.: 11/755,902

(22) Filed: May 31, 2007

(65) Prior Publication Data

US 2008/0295690 A1  Dec. 4, 2008

(51) Int. Cl.
| | |
|---|---|
| B01D 46/00 | (2006.01) |
| B01D 46/46 | (2006.01) |
| B01D 46/30 | (2006.01) |
| B01D 49/00 | (2006.01) |
| B01D 41/00 | (2006.01) |
| B01D 45/18 | (2006.01) |
| B01D 24/00 | (2006.01) |
| B01D 39/06 | (2006.01) |
| B01D 39/14 | (2006.01) |
| B03C 3/00 | (2006.01) |

(52) U.S. Cl. ............. 95/280; 95/20; 95/26; 95/70; 95/276; 96/426; 55/301; 55/302; 55/522; 55/523; 55/524

(58) Field of Classification Search .......... 55/301, 55/302, 522–524; 96/426; 95/20, 26, 70, 95/276, 280
See application file for complete search history.

(56) References Cited

U.S. PATENT DOCUMENTS

| | | | |
|---|---|---|---|
| 729,516 A * | 5/1903 | Steilberg ............ 239/431 |
| 1,170,807 A * | 2/1916 | Egan .................. 181/282 |
| 3,693,884 A * | 9/1972 | Snodgrass et al. ...... 239/427.5 |
| 3,989,471 A * | 11/1976 | Nowak .............. 422/179 |
| 4,558,565 A * | 12/1985 | Kojima et al. ........ 60/286 |
| 4,836,834 A | 6/1989 | Steele |
| 5,008,086 A * | 4/1991 | Merry ............... 422/180 |
| 5,240,485 A * | 8/1993 | Haerle et al. .......... 55/309 |
| 5,833,725 A * | 11/1998 | Dehn et al. ............ 55/302 |
| 5,953,817 A * | 9/1999 | Watanabe et al. ........ 29/890 |
| 6,129,852 A | 10/2000 | Elliott et al. |
| 6,233,926 B1 * | 5/2001 | Bailey et al. .......... 60/295 |
| 6,442,864 B2 * | 9/2002 | Ringer et al. .......... 34/84 |
| 6,726,884 B1 * | 4/2004 | Dillon et al. .......... 422/179 |
| 6,902,592 B2 | 6/2005 | Green et al. |
| 6,989,045 B2 * | 1/2006 | Bailey et al. .......... 95/129 |
| 7,314,501 B2 * | 1/2008 | Fayard .............. 95/14 |
| 7,473,288 B2 * | 1/2009 | Toyoda et al. .......... 55/282.3 |
| 2007/0079606 A1 | 4/2007 | Ehlers |
| 2007/0157809 A1 | 7/2007 | Ehlers |

OTHER PUBLICATIONS

U.S. Appl. No. 11/551,475, filed Oct. 20, 2006, Ehlers.

* cited by examiner

*Primary Examiner*—Walter D Griffin
*Assistant Examiner*—Amber Orlando
(74) *Attorney, Agent, or Firm*—Jeffrey P. Calfa; Mark C. Bach

(57) ABSTRACT

A cone (36) and a ring (38) are accessories separately used during respective phases of cleaning a diesel particulate filter (10, 10') in a cleaning machine that uses compressed air pulses to clean the substrate (12) where particulate matter in engine exhaust has been trapped. In one phase the ring covers the outer perimeter margin of one end face of the substrate, and in the other phase the cone covers a central inner zone of the end face.

8 Claims, 3 Drawing Sheets

DIESEL PARTICULATE FILTER PULSE CLEANER FLOW DIRECTOR SYSTEM AND METHOD

FIELD OF THE INVENTION

This invention relates to apparatus and methods for mechanically removing trapped particulate matter from diesel particulate filters (DPF's) that are used in diesel engine exhaust systems.

BACKGROUND OF THE INVENTION

Diesel particulate filters are currently being used in diesel engine exhaust systems to trap diesel particulate matter (DPM) as exhaust flows through the exhaust system from the engine, thereby preventing the trapped matter from entering the atmosphere.

While an engine is running, the existence of certain conditions enables regeneration of a DPF to be initiated. Various techniques are available for developing temperatures sufficiently high to initiate regeneration and thereafter control on-going regeneration. Regeneration is essentially a chemical process that burns off trapped DPM. For any of various reasons, not all trapped DPM may be burned off by regeneration. Moreover, the burning of trapped DPM may contribute to the build-up of ash, a non-combustible particulate.

Consequently, it may be either necessary or desirable to occasionally use a mechanical, rather than a chemical, process to remove particulate matter, such as DPM and/or ash, from a DPF. The use of compressed air has been proposed as one way to remove the particulate matter, for example as shown in the inventor's pending patent application Ser. No. 11/328,946.

Compressed air is an appropriate medium because it is readily available in service facilities and shops and it is also environmentally friendly.

One way to clean a DPF using compressed air involves certain manual operations such as removing the actual filter module that comprises a DPF substrate from a casing and manually manipulating a compressed air nozzle across a face of the substrate. Dislodged matter is ejected from an opposite face and collected in some type of collector for subsequent disposal.

Equipment that has been designed specifically for cleaning DPF's is commercially available. A DPF to be cleaned is placed in a cleaning machine with the DPF outlet, from which engine exhaust exits the DPF, coupled to a source of compressed air and with the DPF inlet, through which exhaust enters the DPF, coupled to a particulate collector. Compressed air is delivered to the outlet face of the DPF substrate in a succession of air pulses having sufficient pressure to force the air through passages in the substrate. The pulsing dislodges matter from surfaces of the substrate along the passages. The dislodged matter entrains with the flow of air through the substrate and is conveyed out of the substrate through the substrate's inlet face, leaving the DPF inlet and passing into the collector.

Such equipment may facilitate the cleaning of a DPF in certain ways, such as by reducing the amount of time and labor required to clean a DPF.

The inventor has observed that the constructions of certain DPF's and of DPF cleaning machines may prevent a DPF substrate from being substantially uniformly cleaned throughout. Uniform cleaning of a DPF substrate is important in minimizing thermal stresses in the substrate when the DPF is in use in an exhaust system. Less uniform cleaning of a substrate can result in less uniform flow of engine exhaust through the substrate and that in turn creates internal temperature differentials that stress the substrate. Such stressing may contribute to earlier aging of the DPF and therefore should be avoided or at least minimized.

When a DPF has an "open face" construction, a properly designed cleaning machine should be able to deliver compressed air pulses that provide relatively uniform cleaning throughout the substrate. Existing DPF cleaning equipment that has a frustoconical wall whose larger end is fitted to the outlet face of the substrate of an "open face" DPF and through which the pulsed air is delivered to the substrate outlet face is a design that may not provide the best uniformity in cleaning particulate matter from the substrate.

When a DPF does not have an "open face" construction, such as when the DPF casing has a frustoconical wall that enables the DPF to connect into an exhaust system, uniformity of substrate cleaning may not be readily achieved. Consequently, an improvement that promotes thorough cleaning of a DPF substrate over a greater portion of the substrate while the substrate remains in its casing would therefore be considered a desirable improvement in the state of the art.

In the same way, an improvement that promotes thorough cleaning of a DPF substrate over a greater portion of the substrate when cleaned in cleaning equipment that has a frustoconical wall through which the pulsed air is delivered to the substrate outlet face would also be considered a desirable improvement in the state of the art.

SUMMARY OF THE INVENTION

The inventor has discovered that the presence of a frustoconical wall at the face of the substrate, either in a cleaning machine or in a casing containing the substrate, may result in differential cleaning of the substrate, with some portions being more thoroughly cleaned, and other portions less thoroughly cleaned.

Disassembly of a substrate from a DPF casing may not be possible in some DPF designs. If disassembly is possible, the process may be time-consuming, and it exposes the DPF to the risk that re-assembly may not be properly performed.

In the case of an existing cleaning machine, re-design of the machine would seem the only solution.

The present invention provides a solution through the use of relatively simple parts that are essentially accessories.

One of the accessories disclosed here is a flat ring for fitting to and against the outer circular margin of a circular end face of a DPF substrate. When used, this accessory occludes the outer circular margin of the substrate end face while air is pulsed to the substrate through an open circular zone of the substrate end face that is surrounded circumferentially by the ring. The pulsed air flow is thereby constrained to act on a central portion of the substrate extending from the open circular zone of the substrate end face to the opposite end of the substrate.

The other accessory is essentially a cone closed at its smaller end and open at its larger end. The latter end fits concentrically to and against the circular end face of the substrate. When used, this accessory occludes a circular zone at the center of the substrate end face while air is pulsed through the space between the cone and either the frustoconical wall of the DPF casing containing the substrate, or in the case of an "open face" DPF, the frustoconical wall of the cleaning machine. The pulsed air is thereby forced to enter the substrate through the outer circular margin of the substrate end face that is not covered by the cone.

One generic aspect of the present invention relates to a method for dislodging trapped particulate matter from a substrate of a diesel particulate filter (DPF) wherein the larger end of a frustoconical wall is fit to an outer circumference of one end face of the substrate.

The method comprises occluding a portion of the one end face by placing a cover over the portion of the one end face to prevent air from entering the one end of the substrate through the occluded portion, and blowing air toward the one end face through a passageway circumscribed by the frustoconical wall with sufficient pressure to force the air to enter the substrate through an unoccluded portion of the one end face, to pass through the substrate and in the process dislodge particulate matter from the substrate, and to convey the dislodged matter out of the substrate through an opposite end face of the substrate.

During one phase of the method, a ring is used as the cover to occlude the outer perimeter margin of the one end face.

During another phase of the method, a cone is used as the cover to occlude the central inner portion of the one end face.

Another generic aspect relates to two steps of a method for dislodging the trapped particulate matter.

One step comprises occluding an outer margin zone of the one end face while leaving a central inner zone of the one end face unoccluded by covering the outer margin zone to prevent air from entering the one end of the substrate through the outer margin zone and then blowing air toward the one end face through a passageway circumscribed by the frustoconical wall with sufficient pressure to force the air to enter the substrate through the unoccluded central inner zone, to pass through the substrate and in the process dislodge particulate matter from the substrate, and to convey the dislodged matter out of the substrate through an opposite end face of the substrate.

The other step comprises occluding the central inner zone while leaving the outer margin zone unoccluded by covering the central inner zone to prevent air from entering the one end of the substrate through the central inner zone and then blowing air toward the one end face through the passageway circumscribed by the frustoconical wall with sufficient pressure to force the air to enter the substrate through the unoccluded outer margin zone, to pass through the substrate and in the process dislodge particulate matter from the substrate, and to convey the dislodged matter out of the substrate through the opposite end face.

Still another generic aspect relates to cleaning apparatus for mechanically removing trapped particulate matter from a substrate of diesel particulate filter that is used in a diesel engine exhaust system.

The apparatus comprises a frustoconical wall which circumscribes a passageway leading to one end face of the substrate and which has its larger end fit to an outer perimeter of the one end face of the substrate and air delivery apparatus for forcing air to pass through the passageway, enter the substrate through the one end face, pass through the substrate and in the process dislodge particulate matter from the substrate, and convey the dislodged matter out of the substrate through an opposite end face of the substrate.

A set of accessories comprises a first cover and a second cover that are associated with the substrate selectively during first and second phases of use of the cleaning apparatus, each for covering a selected limited portion of the one end face of the substrate during a respective phase of use.

The first cover comprises a ring that has an outer perimeter corresponding substantially to an outer perimeter of the one end face of the substrate and that is disposed in covering relation to an outer perimeter margin of the one end face during the first phase of use to force air delivered by the air delivery apparatus to enter the one end face through a central inner zone circumscribed by the ring, pass through a central inner portion of the substrate, and exit at the opposite end face of the substrate.

The second cover comprises a cone that has a larger end and a smaller end, the larger end having a size for covering at least the open center area of the ring so that when the larger end is disposed in covering relation to the central inner zone during the second phase of use, the cone forces air delivered by the air delivery apparatus to enter the substrate through the outer perimeter margin of the one end face, pass through an outer portion of the substrate, and exit at the opposite end face of the substrate.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIGS. 1 and 2 show a DPF 10 that comprises a cylindrical DPF substrate 12 disposed inside a cylindrical wall 14 of a DPF casing 16. Substrate 12 is associated with wall 14 so that when the DPF is in use in an exhaust system of an engine, exhaust is constrained to flow through passages of substrate 12 between so that the substrate can trap particulate matter in the exhaust. Exhaust enters substrate 12 through one end face 18 and exits at an opposite end face 20.

Figure 1:
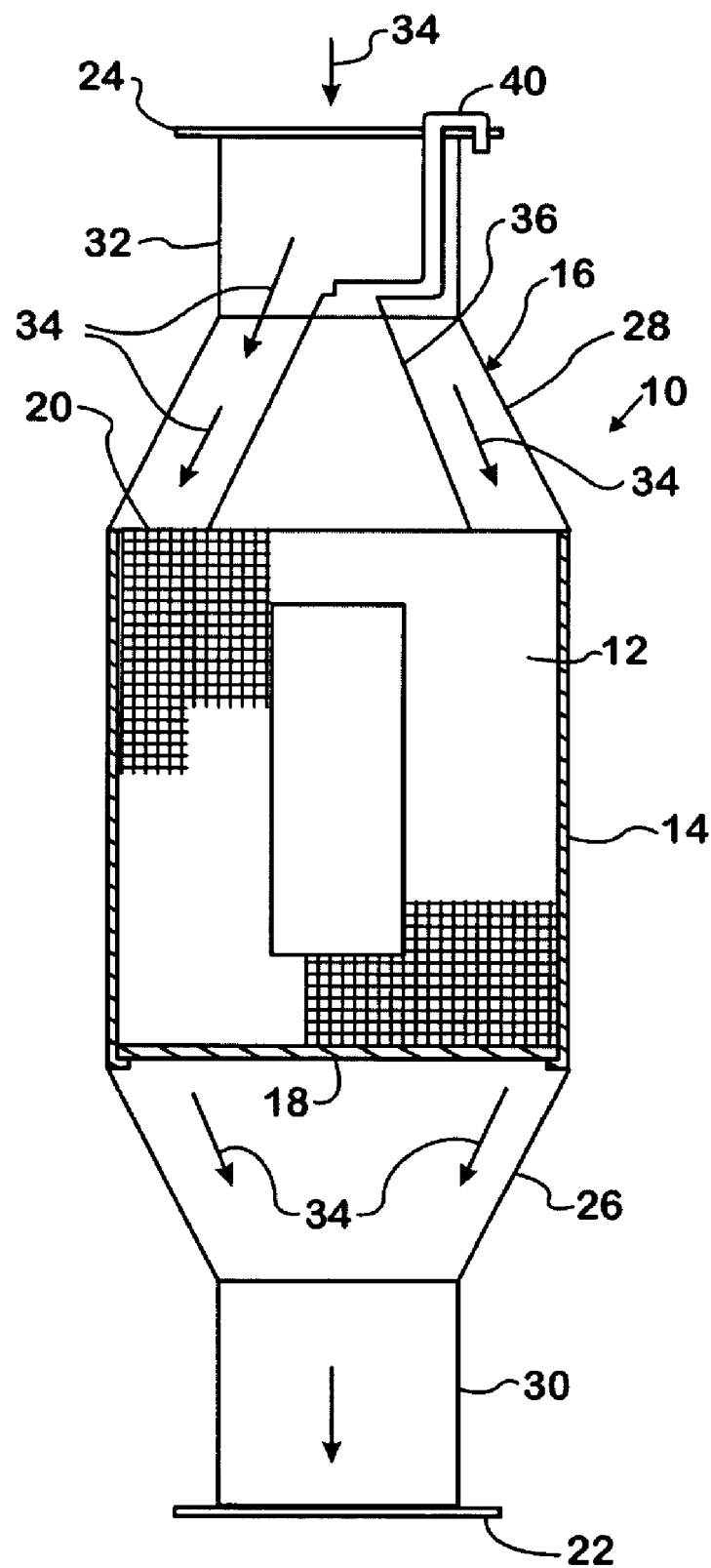
FIG. 1 is a diagram, in cross section, through a DPF illustrating one phase of the cleaning process according to principles of the invention.

Casing 16 comprises an inlet adapter 22 extending from one end of wall 14 and an outlet adapter 24 extending from the opposite end of wall 14 that respectively provide for DPF 10 to connect with an entrance pipe (not shown) through which diesel engine exhaust enters the DPF and an exit pipe (also not shown) through which exhaust that has passed through substrate 12 exits the DPF.

Each adapter 22, 24 comprises a respective frustoconical wall 26, 28 extending away from wall 14 with a narrowing taper and a respective inlet and outlet pipe 30, 32 extending from the smaller end of the respective frustoconical wall 26, 28 to terminate in a respective attachment flange at the end. In this way, wall 26 and inlet pipe 30 circumscribe an inlet passageway of the DPF, and wall 28 and outlet pipe 32 circumscribe an outlet passageway. Hence in an exhaust system, engine exhaust flows in the direction from bottom to top of each FIGS. 1 and 2.

However, when DPF 10 is being mechanically cleaned using a succession of air pulses from a compressed air source, the direction of air flow is opposite, as represented by the arrows 34.

Figure 2:
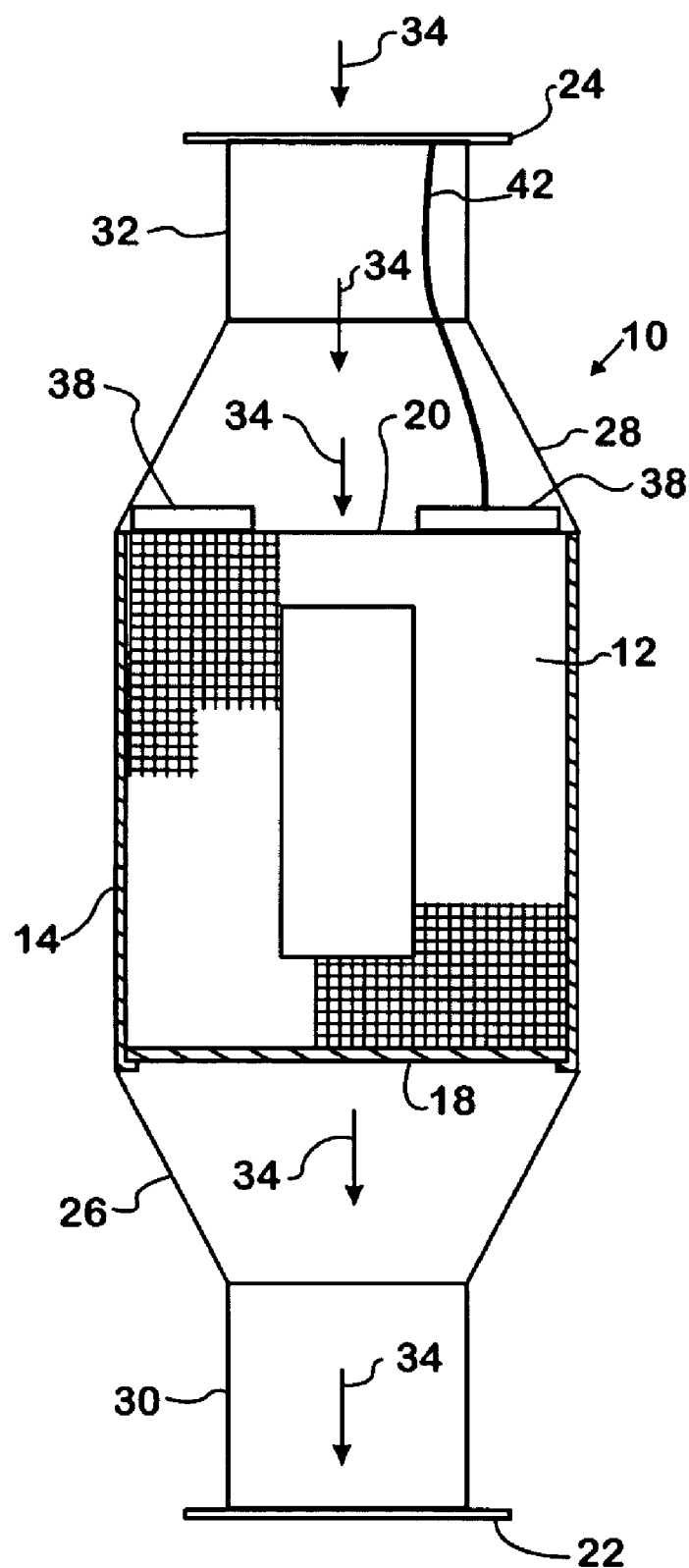
FIG. 2 is a diagram, in cross section, through the DPF illustrating another phase of the cleaning process according to principles of the invention.

Two different accessories are used during respective phases of the cleaning process. One is a cone 36 shown in FIG. 1 depicting one of the phases. The other is a circular ring 38 shown in FIG. 2 depicting the other phase.

In the cleaning phase represented by FIG. 1, cone 36 is inserted into the DPF through pipe 32 to place the larger end of cone 36 over end face 20 so that it occludes a central inner zone of end face 20 while leaving an outer margin of that end face that circumscribes the central inner zone unoccluded. A locator 40 extending from the smaller end of cone 36 can be associated with the attachment flange at the end of pipe 32 by hooking an end of the locator to a hole in the flange to locate the cone generally concentric with the main axis of the substrate.

With cone 36 located inside casing 16 as shown, DPF 10 can be placed in a cleaning machine where an air delivery system is connected to the flange of pipe 32 and a particulate collection system is connected to the flange of pipe 30.

When the air delivery system is operated, air is blown through adapter 24 toward end face 20. The presence of cone 36 causes the air to be directed through the DPF outlet passageway that is circumscribed by adapter 24 so as to enter substrate 12 through the unoccluded outer margin of end face 20, pass through an outer portion of substrate 12, and exit through the opposite end face 18. The air dislodges particulate matter from the outer portion of substrate 12 during passage through the substrate and conveys the dislodged matter out of the substrate through end face 18 and finally out of the inlet passageway to the collection system.

After an appropriate length of time of subjecting the substrate to the pulsating airflow in this way, the cleaning machine is stopped. The air delivery system is disconnected to allow access to the cone so that the cone can be removed. After removal of the cone, the air delivery system is re-connected and again operated for a suitable length of time, now with the full extent of end face 20 unoccluded. Finally the cleaning machine is stopped.

In the cleaning phase represented by FIG. 2, ring 38 is disposed to occlude the outer perimeter margin of end face 20 while leaving the central inner zone of the end face unoccluded. The ability of ring 38 to be inserted into casing 16 through the smaller diameter portions of outlet adapter 24 is attained by making the ring from deformable-reformable material to allow the ring to be deformed for insertion into the casing and reform to its original ring shape as it is placed against end face 20.

With ring 38 located inside casing 16 as shown, DPF 10 can be placed in the cleaning machine and connected in the same way as before.

When the air delivery system is operated, air is blown through adapter 24 toward end face 20. The presence of ring 38 now causes the air to enter substrate 12 through the unoccluded central inner zone of end face 20, pass through a central inner portion of substrate 12, and exit through the opposite end face 18. The air dislodges particulate matter from the central inner portion of substrate 12 during passage through the substrate and conveys the dislodged matter out of the substrate through end face 18 and then through the DPF inlet passageway to the collection system.

After an appropriate length of time of subjecting the substrate to the pulsating airflow in this way, the cleaning machine is stopped. The air delivery system is disconnected to allow access to the ring so that the ring can be removed. After removal of the ring, the air delivery system is re-connected and again operated for a suitable length of time, now with the full extent of end face 20 unoccluded. Finally the cleaning machine is stopped.

The two phase of operation, one using the ring, the other the cone, can be performed in either order and repeated as appropriate.

Figure 3:
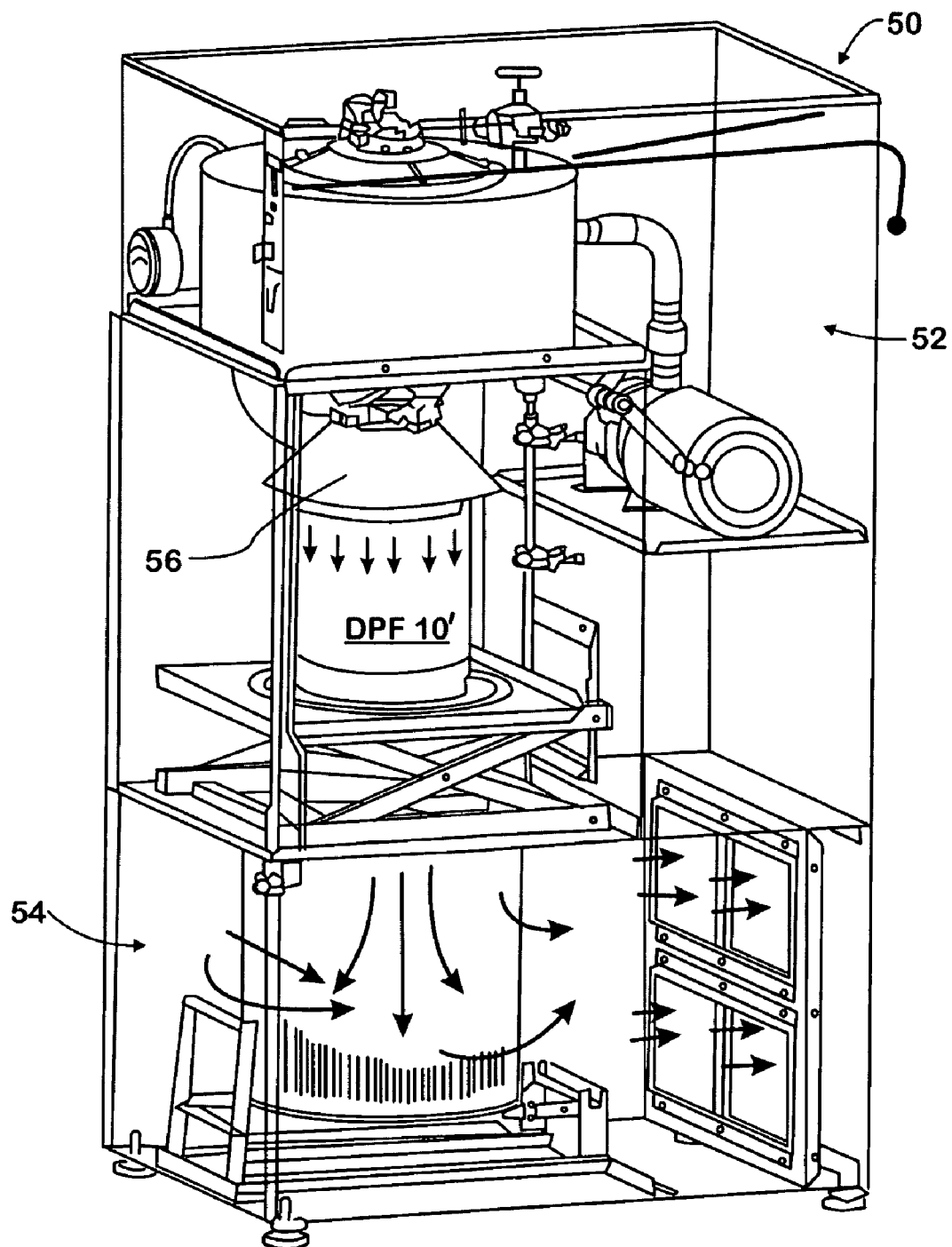
FIG. 3 is a perspective illustration of a cleaning machine for cleaning an "open end" DPF.

FIG. 3 shows a representative cleaning machine 50 having an air delivery system 52 and a particulate collection system 54. The Figure shows an "open-face" DPF 10' being cleaned. The face corresponding to end face 20 of substrate 12 is fit to a frustoconical wall 56 of the air delivery system. In this way wall 56 corresponds with wall 28 of DPF 10. Because DPF 10' is "open-faced", ring 38 need not be made deformable-reformable.

While a presently preferred embodiment of the invention has been illustrated and described, it should be appreciated that principles of the invention apply to all embodiments falling within the scope of the following claims.

What is claimed is:

1. A method for dislodging trapped particulate matter from a substrate of a diesel particulate filter (DPF) wherein the larger end of a frustoconical wall is fit to en outer circumference of one end face of the substrate, the method comprising:

occluding a portion of the one end face by placing a cover over the portion of the one end face to prevent air from entering the one end of the substrate through the occluded portion; and blowing air toward the one end face through a passageway circumscribed by the frustoconical wall with sufficient pressure to force the air to enter the substrate through an unoccluded portion of the one end face, to pass through the substrate and in the process dislodge particulate matter from the substrate, and to convey the dislodged matter out of the substrate through an opposite end face of the substrate;

wherein the step of placing a cover over the one end face to prevent air from entering the one end face through the occluded portion comprises placing the larger end of a cone, over the one end face to occlude an inner zone of the one end face while leaving en outer margin of the one end face that circumscribes the inner zone unoccluded so that when air is blown toward the one end face through the passageway circumscribed by the frustoconical wall, the cone directs the air to enter the substrate through the unoccluded outer margin of the one end face, pass through an outer portion of the substrate, and exit through the opposite end face, with the air dislodging particulate matter from the outer portion of the substrate during passage through the substrate and conveying the dislodged matter out of the substrate through the opposite end face;

wherein the frustoconical wall is part of a DPF casing containing the substrate;

wherein the step of placing an open end of the cone against the one end face comprises inserting the cone into the casing through an opening at a smaller end of the frustoconical wall and securing the cone in place with the open end of the cone against the one end face of the substrate; and placing the casing in a cleaning machine and operating the cleaning machine to blow air through the opening at the smaller end of the frustoconical wall into the casing for passage through the substrate and exiting through an opening at an opposite end of the casing after having passed through the substrate.

2. A method as set forth in claim 1 wherein the step of operating the cleaning machine to blow air through the opening at the smaller end of the frustoconical wall into the casing comprises operating the machine to blow the air as a succession of air pulses.

3. A method as set forth in claim 2 including the further steps of disassociating the casing from the machine after operation of the cleaning machine has ceased to allow the cone to be removed from the casing, removing the cone from the casing, then re-associating the casing with the machine so that air can again be blown through the casing, but now with the one end face of the substrate unoccluded, and then operating the machine to blow air through the casing.

4. A method as set forth in claim 1 wherein the step of placing a cover over the one end face to prevent air from entering the one end face through the occluded portion comprises placing a ring over an outer margin of the one end face that circumscribes a central inner zone of the one end face to leave the central inner zone of the one end face unoccluded so that when air is blown toward the one end face through the passageway circumscribed by the frustoconical wall, the air enters the substrate through the unoccluded portion of the one end face, passes through a central inner portion of the substrate, and exits through the opposite end face, with the air dislodging particulate matter from the central inner portion of the substrate during passage through the substrate and conveying the dislodged matter out of the substrate through the opposite end face.

5. A method as set forth in claim 4 wherein the frustoconical wall is part of a casing containing the substrate, the ring is a piece of deformable-reformable material, and the step of placing the ring against the one end face comprises deforming the piece of material to provide for it to be inserted into the casing through an opening at the smeller end of the frustoconical wall, reforming the piece of material to its original ring shape after insertion into the casing and securing the ring in place against the one end face of the substrate, and including the further steps of placing the casing in a cleaning machine and operating the cleaning machine to blow air through the opening at the smaller end of the frustoconical wall into the casing for passage through the substrate and exiting through an opening at an opposite end of the casing after having passed through the substrate.

6. A method as set forth in claim 5 wherein the step of operating the cleaning machine to blow air through the opening at the smaller end of the fruscoconical wall into the casing comprises operating the machine to blow the air as a succession of air pulses.

7. A method as sat forth in claim 6 including the further steps of disassociating the casing from the machine after operation of the cleaning machine has ceased to allow the ring to be removed from the casing, removing the ring from the casing, then re-associating the casing with the machine so that air can again be blown through the casing, but now with the one end face of the substrate unoccluded, and then operating the machine to blow air through the casing.

8. Cleaning apparatus for mechanically removing trapped particulate matter from a substrate of diesel particulate filter that is used in a diesel engine exhaust system, the cleaning apparatus comprising:

a fruscoconical wall which circumscribes a passageway leading to one end face of the substrate and which has a larger end fit to an outer perimeter of one end face of the substrate;

air delivery apparatus for forcing air to pass through the passageway, enter the substrate through the one end face, pass through the substrate and in the process dislodge particulate matter from the substrate, and convey dislodged matter out of the substrate through an opposite end face of the substrate; and a set of accessories comprising a first cover and a second cover that are associated with the substrate selectively during first and second phases of use of the cleaning apparatus, each for covering a selected limited portion of the one end face of the substrata during a respective phase of use, the first cover comprising a ring that has an outer perimeter corresponding substantially to an outer perimeter of the one end face of the substrate and that is disposed in covering relation to an outer perimeter margin of the one end face during a first phase of use to force air delivered by the air delivery apparatus to enter the one end face through a central inner zone circumscribed by the ring, pass through a central inner portion of the substrate, and exit at the opposite end face of the substrate, and the second cover comprising a cone that has a larger end and a smaller end, the larger end having a size for covering at least the open center area of the ring so that when the larger end is disposed in covering relation to the central inner zone during the second phase of use, the cone forces air delivered by the air delivery apparatus to enter the substrate through the outer perimeter margin of the one end face, pass through an outer portion of the substrate, and exit at the opposite end face of the substrate, wherein the frustoconical wall is part of a DPF casing containing the substrate; and wherein the frustoconical wall has an entrance opening through which the respective covers are inserted into and removed from the casing, the ring has an outside perimeter that is larger than the perimeter of the entrance opening, and the ring is a piece of deformable-reformable material that can be deformed to provide for it to be inserted into the casing through the entrance opening and reformed to its original ring shape after insertion into the casing.

* * * * *